July 8, 1924.
T. A. WILLARD
SEPARATOR
Filed Feb. 17, 1921
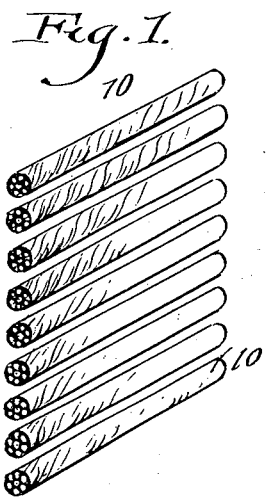
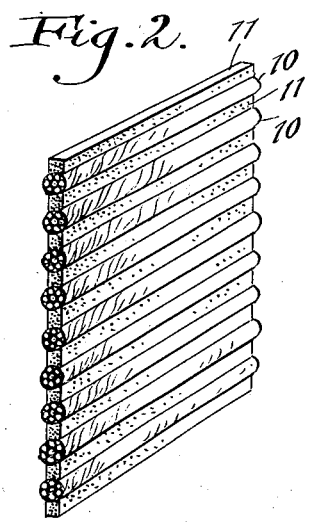
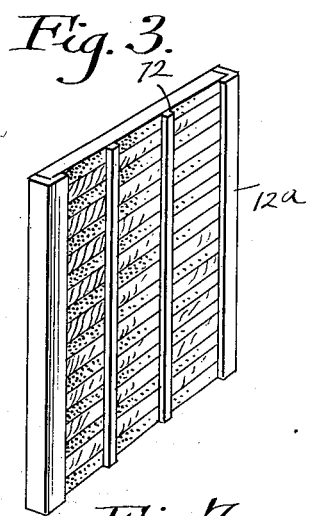
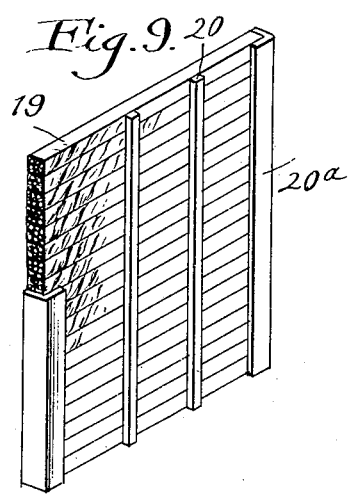
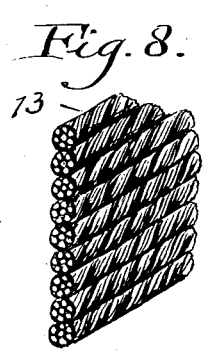
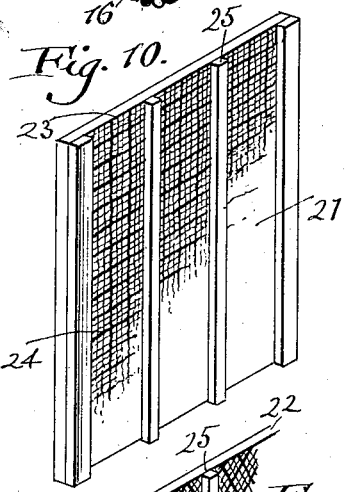
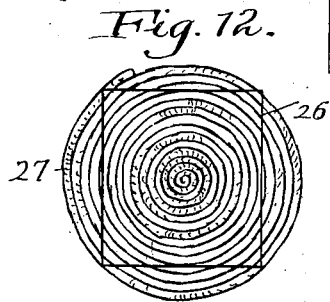
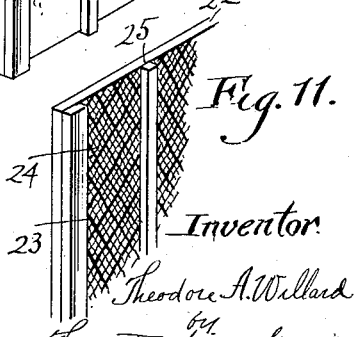
Inventor
Theodore A. Willard
by
Thurston King & Hudson
attys Patented July 8, 1924.

1,500,353

UNITED STATES PATENT OFFICE.

THEODORE A. WILLARD, OF CLEVELAND HEIGHTS, OHIO.

SEPARATOR.

Application filed February 17, 1921. Serial No. 445,673.

*To all whom it may concern:*

Be it known that I, THEODORE A. WILLARD, a citizen of the United States residing at Cleveland Heights, in the county of Cuyahoga and State of Ohio, have invented a certain new and useful Improvement in Separators, of which the following is a full, clear, and exact description.

This invention relates to storage battery separators and to a process of producing the same, and has for its chief object to provide a separator which has low resistance, sufficient porosity, but with the pores or openings so small that the separator is impervious to the active material of the plates, which has long life, and can be produced inexpensively.

Further the invention aims to provide an improved form of separator which is built up of porous material and a suitable binding agency such as rubber.

In general it may be stated that my improved separator is built up of cords, threads, fibres or the like, woven or unwoven, with a binding agency such as rubber, the chief characteristic of which is that this porous material extends in the general direction of the plane of the separator.

The invention may be further briefly summarized as consisting in certain novel details of the improved separator, and the steps in producing it, which will be described in the specification and set forth in the appended claims.

My improved separator may be formed in numerous ways, some of which I have illustrated in the drawings, wherein Fig. 1 shows how a series of cords may be arranged preparatory to being incorporated in the separator; Fig. 2 shows the cords separated by a binding material such as rubber in the form of strips or threads; Fig. 3 shows a ribbed type of separator formed in accordance with the arrangement shown in Fig. 2; Figs. 4, 5, 6 and 7 are enlarged views showing various types of cords or threads which may be employed in producing the separator; Fig. 8 shows how the cords may be arranged in contiguous fashion without the intervening strips or threads of rubber to form the separator; Fig. 9 shows a ribbed separator formed from contiguous cords; Figs. 10 and 11 show separators formed from special cloth or woven threads or cords; and Fig. 12 shows a separator formed from a continuous spiral or circularly arranged cord.

As already stated, it is characteristic of my improved separator that the porous material in woven or unwoven form extends in a direction parallel to the plane of the separator. Another feature of my improved separator is that the porous portions and the rubber or other non-porous binding portions are interspersed or alternated so that the porous portions when the separator is vulcanized or hardened will be stiffened and bound together into one integral but porous body. I will first refer to several ways in which the separator may be formed from unwoven porous material.

In accordance with one form of the invention, a series of cords or threads 10, formed of cotton, hemp, or other suitable material are arranged in parallel fashion, such as shown in Fig. 5, and if these cords are plain unrubberized cords they are preferably separated by strips or threads of rubber 11, such as shown in Fig. 2. When this separator is formed, the cords 10 preferably extend crosswise of it, but it is not essential that the cords be of a length such as to correspond with the width of one separator, but a separator blank having the dimensions of a number of finished separators may be formed and subsequently divided up into smaller separator blanks of suitable size.

The cord and rubber assembly such as shown in Fig. 2 is then compressed and vulcanized in a mold, and this forms a stiff separator body with the individual parts cemented or intimately united. In the mold the separator is usually subjected to considerable pressure, so that the outer faces of the cords become flattened.

In this vulcanizing process the separator may be provided with uneven surfaces by vulcanizing to one face thereof, ribs such as shown at 12 in Fig. 3, these ribs extending at right angles to the cords, and after the separator has been trimmed to the right size it is ready for use.

Above I have mentioned the use of rubber as the binding agency, but I do not wish to be limited to this material as it may be possible to bind or cement the cords together by some other suitable material which will, under treatment, assume a hard condition.

Instead of employing the intervening strips of binding material 11, the binding material may be incorporated in the cords themselves, but if so, this must be done in such a way as not to destroy the porosity of the cores, or at least a sufficient number of them. In this event the cords will be arranged contiguously, as indicated at 13 in Fig. 8, and they will be directly united one to another.

One way of accomplishing this is to have alternate cords rubberized. The term rubberizing as herein used, includes coating or impregnation, such as is obtained by having individual strands or fibres composing the cord, coated with rubber or the binding agency.

Or instead of having alternate cords rubberized, each cord may be partially rubberized. For example, in Fig. 5 the cord is shown as composed of twisted strands 14, part of which, designated 14$^a$, are rubberized.

In Fig. 6 the cord is composed of twisted strands 15, each strand being composed of smaller twisted strands, part of which are rubberized. That is to say, the cord here shown is composed of a number of units, each in turn composed of smaller units, part of which are rubberized.

In Fig. 7 the cord is composed of a large number of twisted strands designated 16, part of which are rubberized, the rubberized strands having no regularity in their location and being at the surface and extending through the body of the cord.

In all these forms of the invention, instead of utilizing rubberized cords or strands, i. e. porous material coated or impregnated with rubber, the strands may be formed of rubber itself.

The cord shown in Fig. 4 is provided with outer twisted strands 17, surrounding a core 18, which may be composed either of rubber or of rubberized material such as used in the other cords. When the core 18 of the cord shown in Fig. 4 is vulcanized, it not only serves as a binding element, but stiffens the core and may be extended into and united direct to the ribs 12$^a$ extending along the upright edges of the separator, these ribs as here shown, being L-shaped and extending over one face and over the edges of the separator.

A separator formed of contiguous cords with alternate cords rubberized, or with rubber embodied in and interspersed with or alternated with porous material as described in connection with Figs. 4 to 7, may assume substantially the form of the separator 19 of Fig. 9, this separator like the separator of Fig. 3 being provided with ribs 20 and 20$^a$ extending vertically or at right angles to the cords.

It will be understood that in vulcanizing the separator 19 the individual cords not only become hard or stiffened, but become vulcanized together. Nevertheless, porosity is provided, due to the fact that part of the cords or parts of each of the cords are porous, the paths of porosity for the electrolyte being from one side of the separator to the other by way of contiguous porous strands or strand sections. It will be understood also that in the vulcanizing process the cords are considerably compacted, so that openings or pores of small size only are formed.

In Fig. 10 I have shown at 21, and in Fig. 11 at 22, a separator wherein woven material is utilized instead of unwoven cords, that is to say, a woven fabric is utilized. In forming this fabric, porous and non-porous threads or strands are interspersed or alternated, the non-porous threads or strands being formed of rubber or rubberized threads or strands. In Figs. 10 and 11 the non-porous rubber or rubberized strands are designated 23, and the porous threads or strands are designated 24. When this fabric, composed partly of rubberized and partly of the porous unrubberized threads or strands is vulcanized, the fabric becomes stiff and the threads or strands are cemented together. A closely woven cloth is utilized so that after vulcanization the pores are exceedingly minute but very numerous so as to provide high porosity.

It was mentioned above that the porous and non-porous threads are alternated, but by this expression I do not mean to imply that there are as many threads or strands of one character as of the other. In forming this fabric the rubberized and unrubberized threads may be arranged in strict alternation, or there may be two porous threads or strands to one of rubber, or three porous strands to one of rubber, or the ratio may be even greater. The separator formed of fabric may be completed by ribs 25, which assist in stiffening the separator body as well as serving the usual function as spacing projections. The strands or threads may run vertically and horizontally as shown in Fig. 10, or diagonally as shown in Fig. 11.

In Fig. 12 I have shown a separator 26 formed from a circularly or spirally arranged cord 27 which may be composed of strands, part of them rubberized or formed of rubber as described in connection with Figs. 4 to 7. After the body is formed substantially as shown in Fig. 12, it will be cut into the separator blanks 26 which will be completed by vulcanization and by ribbing or otherwise providing spacing projections.

It will be understood that while I have shown only the ribbed type of separator, other modes of forming spacing projections such as by corrugation may be made use of.

Having described my invention, I claim:—

1. A separator composed of porous material exposed on both sides of the separator and extending in the general direction of the plane of the separator, with a binding material for uniting the same into a firm mass.

2. A separator having a body composed of porous material extending in the general direction of the plane of the separator, and a binding agency interspersed and alternated with the porous material.

3. A separator composed of a body of porous material extending in the general direction of the plane of the separator, with a binding agency arranged at intervals in the body.

4. A separator composed of a body of porous material extending in the general direction of the plane of the separator, with rubber as a binding agent arranged at intervals in the porous material.

5. A separator composed of porous material and non-porous binding material in strip form, both extending in the general direction of the plane of the separator.

6. A separator composed of alternated and interspersed porous material and a binding material both in the form of strips, threads or cords extending in the general direction of the plane of the separator.

In testimony whereof, I hereunto affix my signature,

THEODORE A. WILLARD